No. 774,911. PATENTED NOV. 15, 1904.
J. S. DE HART, Jr.
VALVE CONNECTION FOR GAS PURIFIERS.
APPLICATION FILED JULY 25, 1904.
NO MODEL.
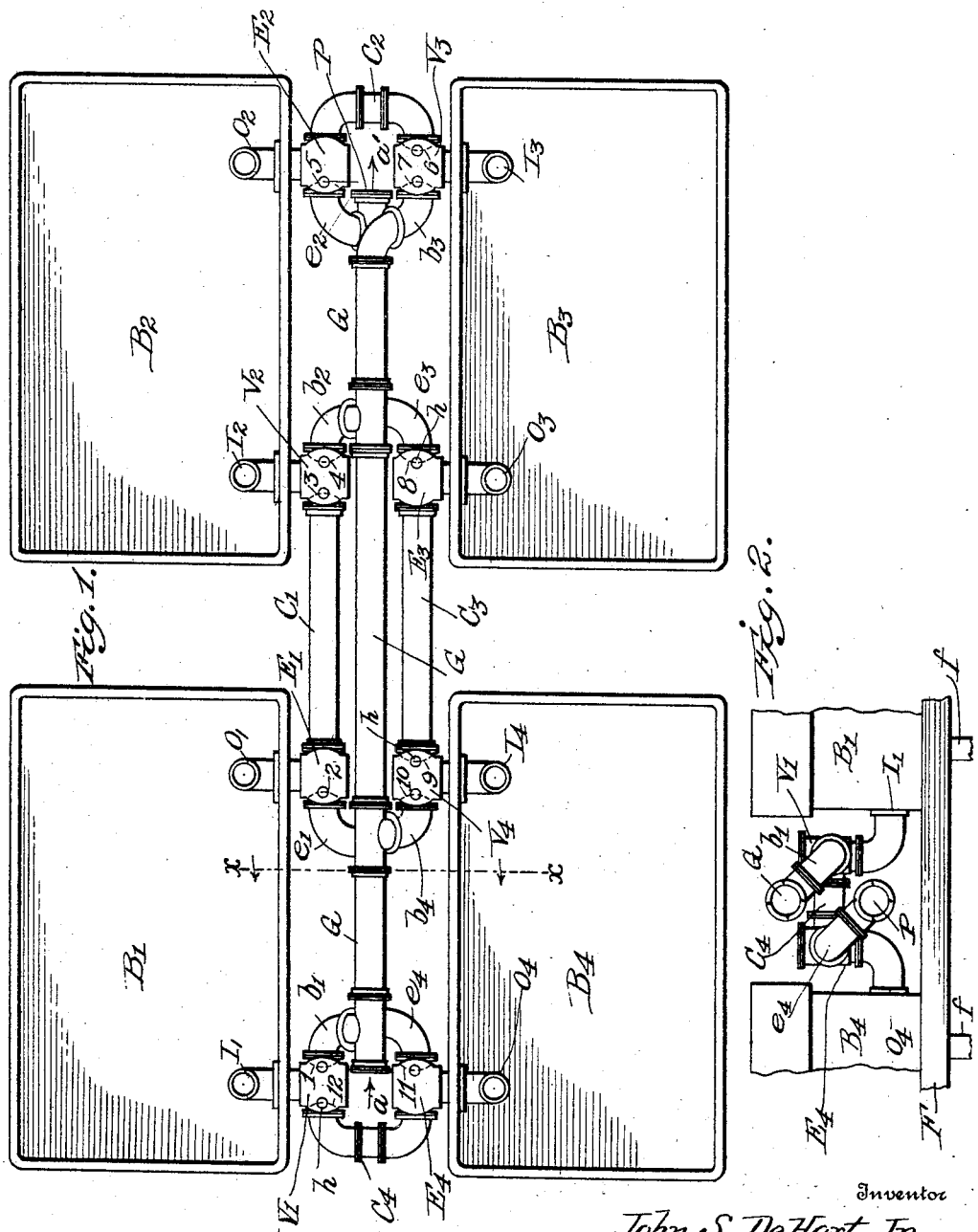
Witnesses
Edwin L. Jewell
J. H. Burgess
Inventor
John S. DeHart Jr.
By W. E. Schoenborn
Attorney No. 774,911.

Patented November 15, 1904.

UNITED STATES PATENT OFFICE.

JOHN S. DE HART, JR., OF EAST ORANGE, NEW JERSEY, ASSIGNOR TO ISBELL-PORTER COMPANY, OF NEWARK, NEW JERSEY, A CORPORATION OF NEW YORK.

VALVE CONNECTION FOR GAS-PURIFIERS.

SPECIFICATION forming part of Letters Patent No. 774,911, dated November 15, 1904.

Application filed July 25, 1904. Serial No. 217,991. (No model.)

*To all whom it may concern:*

Be it known that I, JOHN S. DE HART, Jr., a citizen of the United States, residing at East Orange, in the county of Essex and State of New Jersey, have invented certain new and useful Improvements in Valve Connections for Gas-Purifiers, of which the following is a specification.

My invention relates to an improved arrangement of mains, branch pipes, and valve connections for gas-purifiers whereby a plurality of boxes may be operated in sequence, the gas made to enter any one of the boxes first and then pass through the others or cut out any one of the boxes from the main system when required to recharge with fresh purifying material or repair them without interrupting the use of the remaining boxes.

The objects of my invention are, first, to construct a system of pipes and valve connections whereby a minimum length of piping and number of valves are used in order to install or operate a plurality of boxes of a gas-purifier; second, to arrange pipes, valves, and connections so that any one of the boxes may be cut out or the sequence of operation be quickly and readily changed with the least amount of labor and cost of installation; third, to arrange a system of pipe connections and valves in one aisle of a purifying-house having a plurality of boxes in order that the remaining aisles be as small as possible and the head-room below the purifier be free from all obstructions.

The invention consists of features and relative arrangement of purifier-boxes, pipe, and valve connections, which will be hereinafter more fully described, and particularly pointed out in the appended claims.

In the drawings, in which similar reference characters indicate the same parts in both figures, Figure 1 is a top plan view of my system of piping and valve connections applied to a purifier consisting of four boxes with the covers removed. Fig. 2 is an end elevation at the line $x\ x$ of Fig. 1 looking in the direction indicated by the arrows.

Referring to the drawings, $B'$, $B^2$, $B^3$, and $B^4$ represent four purifier-boxes having their covers removed and supported side by side, with an open space between them sufficiently wide so as to permit the system of pipes and valve connections to be placed therein. As is usual in the construction of the purifiers of gas plants, the boxes are supported upon an elevated flooring F, having uprights $f$, as indicated in Fig. 2, and which has not been fully shown, since it forms no part of the present invention and is readily understood by those skilled in the art of installing gas-manufacturing plants.

The purifier-boxes $B'$, $B^2$, $B^3$, and $B^4$, which are referred to and numbered in the order with which the gas passes through them, are provided with inlets $I'$, $I^2$, $I^3$, and $I^4$ and outlets $O'$, $O^2$, $O^3$, and $O^4$, respectively.

G is one of the trunk-lines placed in the space between the boxes and forms the "main inlet" for the gas. P is the other trunk-line, which is preferably located directly under the main inlet G (see Fig. 2) and forms the "main outlet." The inlets of the boxes are each connected to the interior of similarly-constructed valve-casings $V'$, $V^2$, $V^3$, and $V^4$, and the outlets to the interior of valve-casings $E'$, $E^2$, $E^3$, and $E^4$, respectively. The interior of each of the inlet-valve casings $V'$, $V^2$, $V^3$, and $V^4$ is connected on one side by short branch pipes $b'$, $b^2$, $b^3$, and $b^4$, respectively, to the main inlet-pipe G. The interior of the outlet-valve casings $E'$, $E^2$, $E^3$, and $E^4$ is connected on one side by short branch pipes $e'$, $e^2$, $e^3$, and $e^4$, respectively, to the main outlet-pipe P. $C'$ is a pipe connecting the other side of outlet-valve casing $E'$ with the other side of the inlet-valve casing $V^2$. $C^2$ is a pipe connecting the other side and interior of the outlet-valve casing $E^2$ with the other side and interior of the inlet-valve casing $V^3$. $C^3$ is a pipe connecting the other side and interior of the outlet-valve casing $E^3$ with the other side and interior of the inlet-valve casing $V^4$, and $C^4$ is a pipe connection similar to $C^2$, connecting the other side and interior of the outlet-valve casing $E^4$ with the interior of inlet-valve casing $V'$.

Each of the inlet-valve casings $V'$, $V^2$, $V^3$, and $V^4$ is provided with two valves, which are shown in dotted lines and numbered 1, 12, 3, 4, 6, 7, 9, and 10, and the outlet-valve casings $E'$, $E^2$, $E^3$, and $E^4$ are provided with one valve only and are marked 2, 5, 8, and 11. Valves 1, 4, 7, and 10 control the branch connections $b'$, $b^2$, $b^3$, and $b^4$ of the main inlet with the interior of inlet-valve casings $V'$, $V^2$, $V^3$, and $V^4$, respectively, while valves 2, 5, 8, and 11 control the branch connections $e'$, $e^2$, $e^3$, and $e^4$ with the main outlet P. Valves 3, 6, 9, and 12 control the pipe connections $C'$, $C^2$, $C^3$, and $C^4$ with the inlet and outlet valve casings, as will be clearly seen and understood from Fig. 1 of the drawings. The valves indicated in the different valve-casings may be of any common and well-known gate, disk, or other suitable form of valve found best adapted for the carrying out of the invention and may be operated by a hand-wheel or lever $h$, indicated in the drawings and forming no part of the present invention. It is also to be understood that other forms of inlet and outlet valve casings from that shown could be adopted without departing from the herein-disclosed invention.

The operation of the invention is as follows: If it is desired to use the four boxes $B'$, $B^2$, $B^3$, and $B^4$ of the purifier, the gates or valves 1, 3, 6, 9, and 11 are opened and valves 2, 4, 5, 7, 8, 10, and 12 are closed, when the path of the gas which enters is in the direction of arrow $a$ to the main inlet G, thence through in the following order the parts $b'$ $V'$ $1'$ $B'$ $O'$ $E'$ $C'$ $V^2$ $1^2$ $B^2$ $O^2$ $E^2$ $C^2$ $V^3$ $1^3$ $B^3$ $O^3$ $E^3$ $C^3$ $V^4$ $1^4$ $B^4$ $O^4$ $E^4$ $e^4$ to main outlet P in the direction of arrow $a'$. If it is desired to cut out box $B'$, the valves are in the same position as above, except valves 1 and 3 are closed and 4 is opened, the gas then passing through boxes $B^2$, $B^3$, and $B^4$. When box $B'$ is ready to be thrown into service again, it enters at the end of the sequence by opening valve 12 and admitting gas from box $B^4$, through the connection $C^0$, after the valve 11 is closed, shutting off box $B^4$ from the main outlet P. If it is desired to cut out box $B^2$, valves 1, 3, 4, 5, 6, 8, 10, and 11 are closed and valves 2, 7, 9, and 12 are open. The gas then passes, by means of the main gas-inlet G, directly to the inlet of box $B^3$, thence through $B^4$, and then through box $B'$, and the valve 3 being closed and valve 2 open permits the gas to pass into the main gas-outlet P. When it is desired to cut out box $B^3$, the valves 1, 2, 4, 6, 7, 8, 9, and 11 are closed and valves 3, 5, 10, and 12 are open. The gas then passes, by means of the main gas-inlet, directly to the inlet of box $B^4$, then passes through box $B'$, and then through box $B^2$, and the valve 6 being closed and valve 5 open the gas passes to the main gas-outlet P. Box $B^4$ may be cut out in a similar manner by having the gas first enter box $B'$, then pass through box $B^2$ and finally box $B^3$ to the main gas-outlet. This same rotation and operation of valves may be continued indefinitely, and, if so desired, more than one box may be cut out at any one time.

From the foregoing detailed description of the invention and the mode of operating the same it will be clearly seen that I have devised a system of mains, branch pipes, and valve connections in which the objects set out in the statement of invention are fully attained and efficiently carried out.

Having now fully described my invention, what I claim as new, and desire to secure by Letters Patent, is as follows:

1. A purifier for gas or the like, comprising a plurality of purifying-boxes arranged side by side with an intervening space between them and each having an inlet and an outlet, a main gas-inlet and a main gas-outlet located in the intervening space, an inlet-valve chamber connected to and for each of the inlets of the boxes, an outlet-valve chamber connected to and for each of the outlets of the boxes, branch pipes connecting one side and interior of each of the inlet-valve chambers with the main gas-inlet, branch pipes connecting one side and interior of each of the outlet-valve chambers with the main gas-outlet, a pipe connecting the other side and interior of each outlet-valve chamber with the other side and interior of the inlet-valve chamber of the next box in the sequence, two controlling-valves in each of the inlet-valve chambers, and a controlling-valve in each of the outlet-valve chambers.

2. A purifier for gas or the like, comprising four purifying-boxes arranged side by side with an intervening space between them and each having an inlet and an outlet, a main gas-inlet and a main gas-outlet located in the intervening space, an inlet-valve chamber connected to and for each of the inlets of the boxes, an outlet-valve chamber connected to and for each of the outlets of the boxes, branch pipes connecting one side and interior of each of the inlet-valve chambers with the main gas-inlet, branch pipes connecting one side and interior of each of the outlet-valve chambers with the main gas-outlet, a pipe connecting the other side and interior of each outlet-valve chamber with the other side and interior of the inlet-valve chamber of the next box in the sequence, two controlling-valves in each of the inlet-valve chambers, and a controlling-valve in each of the outlet-valve chambers.

In testimony whereof I affix my signature in presence of two witnesses.

JOHN S. DE HART, Jr.

Witnesses:
ROBERT K. WEHNER,
J. A. WILLIAMSON.